(12) United States Patent
Tsuji

(10) Patent No.: US 7,167,008 B2
(45) Date of Patent: Jan. 23, 2007

(54) MICROWAVE SENSOR FOR OBJECT DETECTION BASED ON REFLECTED MICROWAVES

(75) Inventor: Masatoshi Tsuji, Otsu (JP)

(73) Assignee: Optex Co., Ltd., Shiga (JP)

(*) Notice: Subject to any disclaimer, the term of this patent is extended or adjusted under 35 U.S.C. 154(b) by 0 days.

(21) Appl. No.: 11/176,183

(22) Filed: Jul. 8, 2005

(65) Prior Publication Data

US 2006/0006882 A1    Jan. 12, 2006

(30) Foreign Application Priority Data

Jul. 9, 2004    (JP)    ............... 2004-203444

(51) Int. Cl.
G01R 27/04   (2006.01)
G01S 13/00   (2006.01)
G08B 13/18   (2006.01)

(52) U.S. Cl. .................. 324/644; 342/28; 340/554

(58) Field of Classification Search ............... 342/27, 342/28; 324/644
See application file for complete search history.

(56) References Cited

U.S. PATENT DOCUMENTS 6,380,882 B1 * 4/2002 Hegnauer ............... 342/28
6,677,887 B1 * 1/2004 Harman ................... 342/28
6,842,113 B1 * 1/2005 Tsuji ..................... 340/554
6,859,164 B1 * 2/2005 Kurita et al. .............. 342/28
6,922,059 B1 * 7/2005 Zank et al. ............... 324/457

* cited by examiner

Primary Examiner—Anjan Deb
Assistant Examiner—Jeff Natalini
(74) Attorney, Agent, or Firm—Wenderoth, Lind & Ponack, L.L.P.

(57) ABSTRACT

A microwave sensor transmits a plurality of microwaves of different frequencies toward a detection area and carries out an object detection operation based on reflected waves of the microwaves from an object present in the detection area. The microwave sensor includes a distance identification section for obtaining a relative distance to the object in the detection area, a movement-distance identification section for obtaining a movement distance per unit of time of the object in the detection area, and an object determination section that receives output from the distance identification section and the movement-distance identification section and carries out an operation for determining object detection by setting the movement distance value per unit of time, which is a threshold for determining object detection, smaller for longer relative distances to the object in the detection area.

8 Claims, 4 Drawing Sheets

FIG.3 (a) Conventional Art
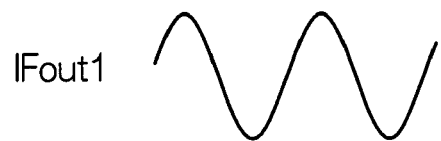
IFout1
FIG.3(b) Conventional Art
IFout2
FIG.4(a) Conventional Art
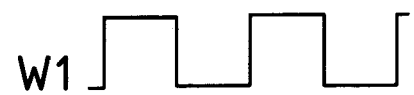
W1
FIG.4 (b) Conventional Art
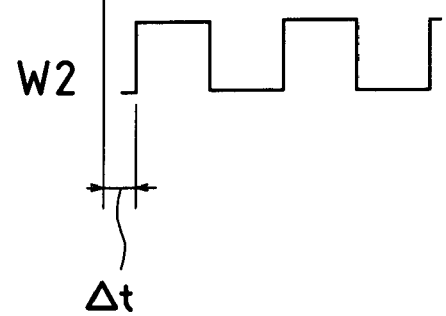
W2
Δt

MICROWAVE SENSOR FOR OBJECT DETECTION BASED ON REFLECTED MICROWAVES

CROSS-REFERENCE TO RELATED APPLICATION

This application claims priority under 35 U.S.C. § 119(a) to Patent Application No. 2004-203444 filed in Japan on Jul. 9, 2004, the entire contents of which are hereby incorporated by reference.

BACKGROUND OF THE INVENTION

Field of Invention

The present invention relates to microwave sensors and particularly relates to microwave sensors that very exactly detect only a target intended to be detected and in which reliability has been improved by avoiding occurrences of false alerts as much as possible.

Conventionally, as one form of a crime prevention device, microwave sensors are known (see Japanese Patent Laid-Open Publication H7-37176(1995) for example) in which microwaves are emitted toward a detection area, and when a human figure (an intruder) is present in the detection area, the human figure is detected by receiving the reflected waves (microwaves modulated due to the Doppler effect) from the human figure.

Moreover, one type of microwave sensor is known that uses a plurality of microwaves of different frequencies to measure the distance to an object (hereinafter referred to as "target") such as a human figure that is present in the detection area. This type of sensor emits, for example, two microwaves of different frequencies toward the detection area and detects the phase difference between two IF signals based on the respective reflected waves. The phase difference has a mutual relation to the distance to the target in that there is a tendency for the phase difference to also increase for larger distances to the target. In other words, it is possible to measure the distance to the target by determining the phase difference. Furthermore, by identifying temporal changes in the phase difference, it is also possible to determine whether or not the target is moving in the detection area. This makes it possible, for example, to determine only a target that is moving in the detection area as the target (intruder) intended to be detected.

Next, the operation of detecting the phase difference in the IF signals in this type of sensor is described.

When IF signals based on the reflected waves of microwaves of two different frequencies are given as sine waves IFout1 and IFout2 (having a phase difference corresponding to the distance to the target) as shown in FIGS. 3(a) and 3(b), rectangular waves W1 and W2 formed from these IF signals are obtained as shown respectively in FIGS. 4(a) and 4(b). It is then possible to measure the distance to the target by detecting the phase difference (calculated from a time difference (t) between rising portions of the rectangular waves shown in the drawings) between these rectangular waves W1 and W2. Furthermore, by identifying temporal changes in the phase difference between the rectangular waves W1 and W2, it is possible to identify movement of the target in the detection area (whether the target is approaching or receding from the sensor).

However, the following problems have been encountered when using this type of sensor as a crime prevention sensor to identify temporal changes in the phase difference and determine that only a target moving in a detection area is a target (intruder) intended to be detected.

Namely, there is a possibility that a phase difference will be created between the rectangular waves W1 and W2 by the shaking (moving) of trees and plants or the like due to wind when this type of sensor is installed outdoors, and in this way, the trees and plants or the like are erroneously detected as a target intended to be detected, thus resulting in a false alert being issued. Similarly, there is a possibility that a phase difference will be created between the rectangular waves W1 and W2 by the rotational movement of a ventilation fan or the shaking of such items as blinds or curtains due to wind when this type of sensor is installed indoors, and in this case too, objects other than human figures are erroneously detected as targets intended to be detected, thus resulting in a false alert being issued.

Accordingly, the inventors of the present invention have already proposed technology (see Japanese Patent Laid-Open Publication 2003-207462) for avoiding false alerts by accurately carrying out determination between targets intended to be detected, such as human figures, and objects that are not intended to be detected (such as plants and fans for example).

In the proposed technology, the amount of change per unit of time in the relative distance to a target present in the detection area is measured based on the reflected waves, and the target is determined to be a target intended to be detected only when the amount of change is a predetermined threshold or more. That is, the movement distances involved with items such as plants shaking due to the wind or a fan that is rotating are minor in comparison to that of a human figure or the like intended to be detected, which involve large movement distances. By identifying this difference, a determination is made as to whether or not an item is a target intended to be detected. It should be noted that the above-mentioned threshold is referred to as a "plants countermeasure level" in the following description.

When a conventional microwave sensor 100 is installed outdoors, it is common that plants and trees used as fencing are present on the periphery of the supervision area 10, or that the microwave sensor 100 is installed at the periphery of the supervision area 10. As a result, it is often the case that plants and trees or the like are present in the vicinity of the microwave sensor 100. Since the detection level is high for objects in the vicinity of the microwave sensor 100, these plants and trees or the like can easily become a cause of false alerts. Accordingly, in order to handle this and avoid such false alerts as much as possible, the above-mentioned plants countermeasure level is set to "movement distance in 1 second period: 50 cm", for example, as the amount of change in a distance in which false alerts do not occur even if plants and trees or the like are shaking.

The following is a description with reference to FIG. 5 of the influence that the plants countermeasure level exerts on the detection of an intruder. Here, FIG. 5 is an explanatory diagram of a relationship between a plants countermeasure level d100 in a conventional microwave sensor 100 and the movement of an intruder.

(1) When an Intruder Approaches from Substantially the Front

First, a case is considered in which an intruder approaches from substantially the front of the microwave sensor 100.

When an intruder approaches from a substantially front-on position from a line 11 of a predetermined distance comparatively close to the microwave sensor 100 as shown by M1a, the microwave sensor 100 obtains a value substantially equivalent to the length of M1a as the amount of change in the distance to the target.

Similarly, when an intruder approaches from a substantially front-on position from a line 12 of a predetermined distance comparatively distant from the microwave sensor 100 as shown by M2a (same length as M1a), the microwave sensor 100 obtains a value substantially equivalent to the length of M2a as the amount of change in the distance to the target.

In either case, since the amount of change in the distance to the target exceeds the plants countermeasure level d100, the microwave sensor 100 is able to detect the intruder.

(2) When an Intruder Moves Crosswise Over the Supervision Area 10

Next, a case is considered in which an intruder appears at a side of the supervision area 10 of the microwave sensor 100 (corresponding to the upper or lower part in FIG. 5) and moves crosswise over the supervision area 10 with almost no approaching movement toward the microwave sensor 100.

When an intruder approaches from a position at one side (upper side in FIG. 5) on the line 11 of a predetermined distance comparatively close to the microwave sensor 100 as shown by M1b, the value obtained as the amount of change in the distance from the microwave sensor 100 to the target is not a value substantially equivalent to the length of M1b, but rather is a value that corresponds to a component of M1b in the direction toward the microwave sensor 100. In this case too, if the angle formed by the direction toward the microwave sensor 100 and the direction of M1b is comparatively small, the amount of change in the distance to the target exceeds the plants countermeasure level d100 and the microwave sensor 100 is able to detect the intruder.

However, when an intruder approaches from a position at one side (upper side in FIG. 5) on the line 12 of a predetermined distance comparatively distant from the microwave sensor 100 as shown by M2b, the angle formed by the direction toward the microwave sensor 100 and the direction of M2b becomes large so as to be close to a right angle. The value obtained as the amount of change in the distance from the microwave sensor 100 to the target is considerably small since it is a value that corresponds to a component of M2b in the direction toward the microwave sensor 100, such that the amount of change in the distance to the target does not exceed the plants countermeasure level d100 and the microwave sensor 100 is unable to detect the intruder.

In other words, when the plants countermeasure level d100 is set large so as to avoid as much as possible any false alert due to close range plants and trees or the like when installed outdoors, the conventional microwave sensor 100 may be unable to accurately detect an intruder in cases such as when the intruder moves crosswise over the supervision area 10 at a location comparatively distant from the microwave sensor 100.

SUMMARY OF THE INVENTION

An object of the present invention is to provide a microwave sensor capable of avoiding as much as possible false alerts due to close range plants and trees or the like when installed outdoors and also capable of carrying out accurate detection even when an intruder moves crosswise over the supervision area at a long range.

A microwave sensor according to the present invention, being a microwave sensor that transmits a plurality of microwaves of different frequencies toward a detection area and carries out an object detection operation based on reflected waves of the microwaves from an object present in the detection area, is provided with: a distance identification means for obtaining a relative distance to the object present in the detection area based on the reflected waves, a movement-distance identification means for obtaining a movement distance per unit of time of the object present in the detection area, and an object determination means that receives output from the distance identification means and the movement-distance identification means and, when the relative distance to the object present in the detection area is greater than a predetermined value, carries out an operation for determining object detection by setting the movement distance value per unit of time, which is a threshold for determining object detection, smaller than when the relative distance does not exceed a predetermined value.

Here, the distance identification means may be configured to measure a relative distance to the object based on a phase difference of reflected waves of the microwaves from the object present in the detection area. Furthermore, the movement-distance identification means may be configured to receive output from the distance identification means and measure an amount of change per unit of time in the relative distance to the object.

With a microwave sensor according to the present invention, the movement distance value per unit of time, which is a threshold for determining object detection, is set lower when the relative distance to the object is long compared to when it is short. In this way, it is possible in the close range to avoid as much as possible false alerts due to change being detected in the relative distances to an object that is not properly intended to be a detection target, while being able to reliably detect an object that is properly intended to be a detection target. Additionally, in the long range, it is possible to carry out exact detection even when an object properly intended to be a detection target moves in a direction in which there is no large change in the relative distance. For example, when a microwave sensor according to the present invention is installed outdoors, it is possible to avoid as much as possible false alerts due to plants and trees or the like in the vicinity of the installation position and to accurately carry out detection even when an intruder moves crosswise over the supervision area at a long range.

A microwave sensor according to the present invention may also be a microwave sensor that transmits a plurality of microwaves of different frequencies toward a detection area and carries out an object detection operation based on reflected waves of the microwaves from an object present in the detection area, provided with: a distance identification means for obtaining a relative distance to the object present in the detection area based on the reflected waves, a movement-distance identification means for obtaining a movement distance per unit of time of the object present in the detection area, and an object determination means that receives output from the distance identification means and the movement-distance identification means and carries out an operation for determining object detection by setting the movement distance value per unit of time, which is a threshold for determining object detection, smaller for longer relative distances to the object present in the detection area.

With a microwave sensor according to the present invention, the movement distance value per unit of time, which is a threshold for determining object detection, is set smaller for longer relative distances in accordance with the relative distance to the object. In this way, it is possible in the close range to avoid as much as possible false alerts due to change being detected in the relative distances to an object that is not properly intended to be a detection target, while being able to reliably detect an object that is properly intended to be a detection target. Additionally, in the long range, it is possible to carry out exact detection even when an object properly intended to be a detection target moves in a direction in which there is no large change in the relative distance. Moreover, in regard to intermediate distances too, it is possible to avoid false alerts and accurately detect the intended detection object target.

BRIEF DESCRIPTION OF THE DRAWINGS

FIGS. 3(a) and 3(b) are signal waveforms of a conventional dual-frequency microwave sensor, with FIG. 3(a) showing a signal waveform IFout1 and FIG. 3(b) showing another signal waveform IFout2.

FIGS. 4(a) and 4(b) are drawings of waveforms of rectangular waves obtained by wave-shaping each of the IF output signals shown in FIGS. 3(a) and 3(b), with FIG. 4(a) showing one rectangular wave W1 and FIG. 4(b) showing another rectangular wave W2.

DESCRIPTION OF THE PREFERRED EMBODIMENTS

Hereinafter, embodiments of the present invention will be described with reference to the accompanying drawings. Description here will be given concerning a case in which a microwave sensor is used as a crime prevention sensor, in which the present invention is applied to a microwave sensor that uses microwaves of two different frequencies to determine a target detection object (an intruder or the like).

<Circuit Configuration of Microwave Sensor 1>

Figure 1:
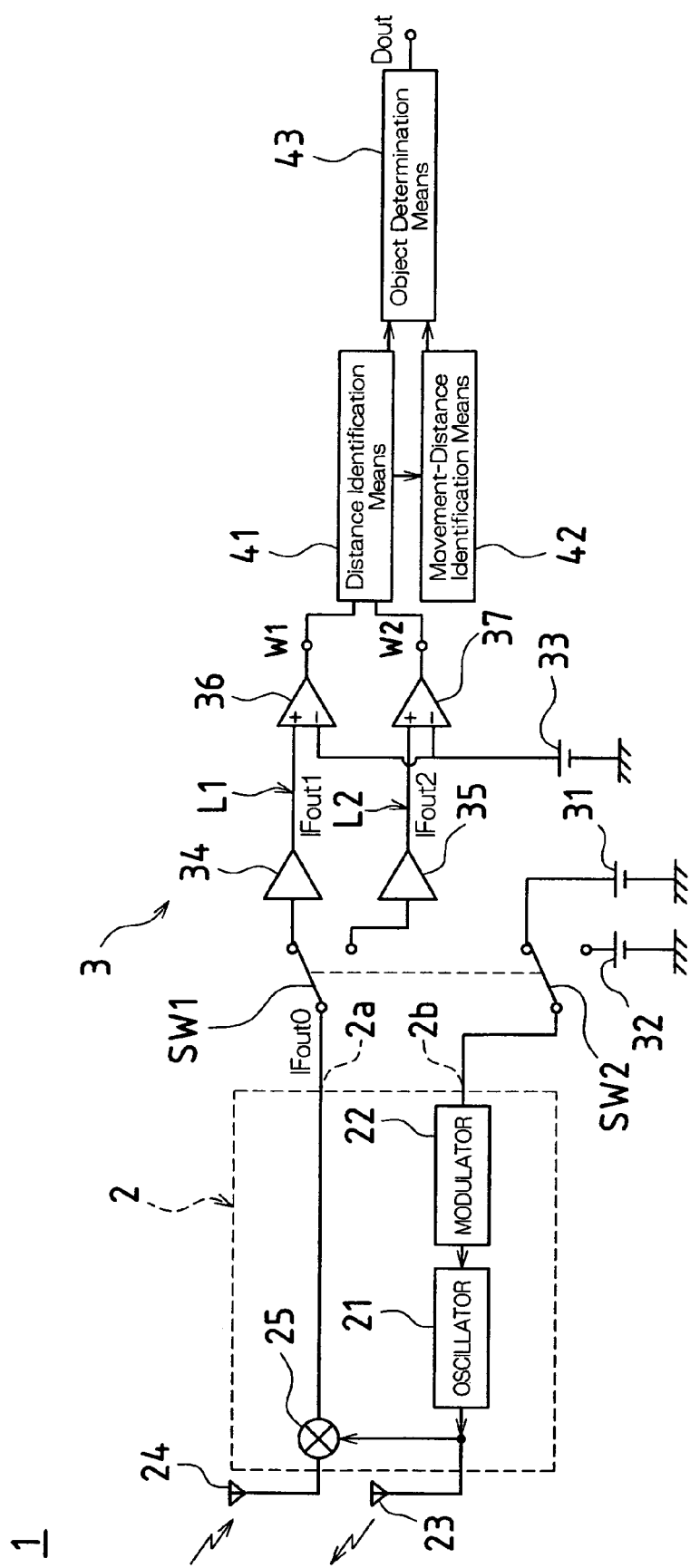
FIG. 1 is a schematic diagram showing a circuit configuration of a microwave sensor associated with one embodiment of the present invention.

FIG. 1 is a schematic diagram showing a circuit configuration of a microwave sensor 1 associated with one embodiment of the present invention. As shown in this drawing, the microwave sensor 1 is provided with an RF module 2 and a signal processing portion 3.

The RF module 2 is provided with an oscillator 21 that generates microwaves, a modulator 22 for switching the frequencies of microwaves generated by the oscillator 21, a transmitting antenna 23 that transmits the microwaves generated by the oscillator 21 toward a detection area, a receiving antenna 24 that receives the reflected waves of the microwaves reflected by an object such as a human figure or the like, and a mixer 25 that mixes the received microwaves and the voltage waveforms of the oscillator 21 and outputs the result. More specifically, microwaves are transmitted from the transmitting antenna 23 toward a detection area, and when, for example, a human figure or the like is present in the detection area, the reflected waves from the human figure or the like with the frequency modulated due to the Doppler effect are received by the receiving antenna 24. The received reflected waves are mixed with the voltage waveforms of the oscillator 21 by the mixer 25, and are then outputted as IF output signals (IFout 0) from an output side 2a of the RF module 2 to the signal processing portion 3.

The signal processing portion 3 is provided with a first output line L1 having an IF amplifier 34 and a comparator 36, and a second output line L2 having an IF amplifier 35 and a comparator 37, which correspond to the frequencies of the microwaves transmitted from the transmitting antenna 23, as well as a power source 33 that is the reference voltage of the comparators 36 and 37. Further still, power sources 31 and 32 are provided in order for the RF module 2 to generate two types of microwaves, and arranged at output sides of the comparators 36 and 37 are a distance identification means 41, a movement-distance identification means 42, and an object determination means 43, which are characteristic features of the present embodiment. It should be noted that each of these means will be described later.

The IF amplifiers 34 and 35 are connected to the output side 2a of the RF module 2 via a first switch SW1. The first switch SW1 is switchable in that it connects to the first output line L1 when one of the above-mentioned two types of microwaves is transmitted from the transmitting antenna 23 and connects to the second output line L2 when the other type of microwave is transmitted from the transmitting antenna 23. That is, it is configured so that an IF output signal pertaining to reflected waves reflected by a human figure or the like is outputted to the first output line L1 when one type of the microwaves is being transmitted and an IF output signal pertaining to reflected waves reflected by a human figure or the like is outputted to the second output line L2 when the other type of the microwaves is being transmitted.

The power sources 31 and 32 are connected to an input side 2b of the RF module 2 via a second switch SW2 that works together with the above-mentioned first switch SW1. The connection state of the second switch SW2 to the power source 31 or 32 also changes depending on which of the two types of microwaves is transmitted from the transmitting antenna 23. That is, the frequency of microwaves from the modulator 22 switches between a state in which the second switch SW2 is connected to the power source 31 on the one hand and a state in which it is connected to the power source 32 on the other hand, and in this way the frequency of microwaves transmitted from the transmitting antenna 23 is switchable.

Along with the switching operation of the first switch SW1 and the second switch SW2, two processing operations (a first processing operation and a second processing operation) are switched at a predetermined time interval (for example, an interval of several milliseconds). Here, the first processing operation is an operation in which one of the frequencies of microwaves is transmitted from the transmitting antenna 23 toward the detection area, an IF output signal based on the reflected waves thereof is outputted to the first output line L1 of the signal processing portion 3, and signal processing is performed in the first output line L1. The second processing operation is an operation in which the other of the frequencies of microwaves is transmitted from the transmitting antenna 23 toward the detection area, an IF output signal based on the reflected waves thereof is outputted to the second output line L2 of the signal processing portion 3, and signal processing is performed in the second output line L2. In the first processing operation, the IF output signal that is output from the RF module 2 is amplified by the IF amplifier 34, and the output (IFout 1) from the IF amplifier 34 is formed into a rectangular wave W1 by the comparator 36 and outputted to the distance identification means 41. Similarly, in the second processing operation, the IF output signal that is output from the RF module 2 is amplified by the IF amplifier 35, and the output (IFout 2) from the IF amplifier 35 is formed into a rectangular wave W2 by the comparator 37 and outputted to the distance identification means 41.

To describe these processing operations in further detail, when there is no object such as a human figure or the like present in the detection area, the frequency of the microwaves transmitted from the transmitting antenna 23 and the frequency of the microwaves received at the receiving antenna 24 are the same, and therefore the IF frequency in the output signals from the IF amplifiers 34 and 35 is "0," and no signal is outputted from the comparators 36 and 37.

In contrast to this, when a human figure or the like is present in the detection area, the microwaves received at the receiving antenna 24 are changed with respect to the frequency of the microwaves that were transmitted from the transmitting antenna 23 and have a different frequency, and therefore a change is produced in the waveforms of the output signals of the comparators 36 and 37, and these rectangular waves are outputted to the distance identification means 41.

<Distance Identification Means 41, Movement-Distance Identification Means 42, and Object Determination Means 43>

The following is a description concerning the distance identification means 41, the movement-distance identification means 42, and the object determination means 43 for carrying out object determination based on waveforms of output signals from the comparators 36 and 37.

The distance identification means 41 receives the output signal waveforms from the comparators 36 and 37 and obtains the relative distance to an object present in the detection area based on these output signal waveforms. That is, it is configured to measure the relative distance to an object based on the phase difference of the microwaves reflected from the object present in the detection area. More specifically, the phase difference of the two IF output signals (IFout 1 and IFout 2) has a mutual relation to the distance to the object (target) in that the phase difference has a tendency to increase for larger distances to the object. In other words, the distance identification means 41 is configured to measure the distance to the object by obtaining the phase difference.

The movement-distance identification means 42 obtains the movement distance (not velocity, but a distance the object has actually moved in a one-second period, for example) of the object present in the detection area per unit of time. That is, it is configured to receive output from the distance identification means 41 and obtain the movement distance per unit of time of the object by measuring the amount of change in the relative distance to the object per unit of time.

The object determination means 43 is configured to receive output from the distance identification means 41 and the movement-distance identification means 42, and carries out an operation for determining object detection by setting the above-described plants countermeasure level lower for longer relative distances to the object present in the detection area in order to determine whether the object is a target intended to be detected or whether it is a plant or the like shaking due to the wind. That is, when the position of the object in the detection area is a comparatively close position to the microwave sensor 1, the plants countermeasure level is set to a value corresponding to a movement distance that is very unlikely to be accounted for by plants shaking due to the wind. In contrast to this, when the position of the object in the detection area is a comparatively distant position from the microwave sensor 1, the plants countermeasure level is set to a very small value.

It should be noted that the relative distance from the microwave sensor 1 to the object can be calculated by the following formula (1):

$$R = c \cdot \Delta\phi / 4\pi \cdot \Delta f \quad (1)$$

Here, "R" is the relative distance to the object, "c" is light velocity, "Δϕ" is the phase difference between the rectangular waves W1 and W2, and "Δf" is the difference in frequency between the two types of microwaves generated by the oscillator 21.

The distance identification means 41 calculates the distance to the object every predetermined interval of time using formula (1). Furthermore, the movement-distance identification means 42 measures the amount of change in the distance to the object per unit of time. Then, when the above-mentioned amount of change (movement distance of the object) is large in comparison to the plants countermeasure level that is set in advance according to the relative distance to the object, the object determination means 43 determines that this object is an object (human figure) intended to be detected and outputs an object detection signal Dout.

<Example of the Plants Countermeasure Level d1 Setting of the Microwave Sensor 1>

Figure 2:
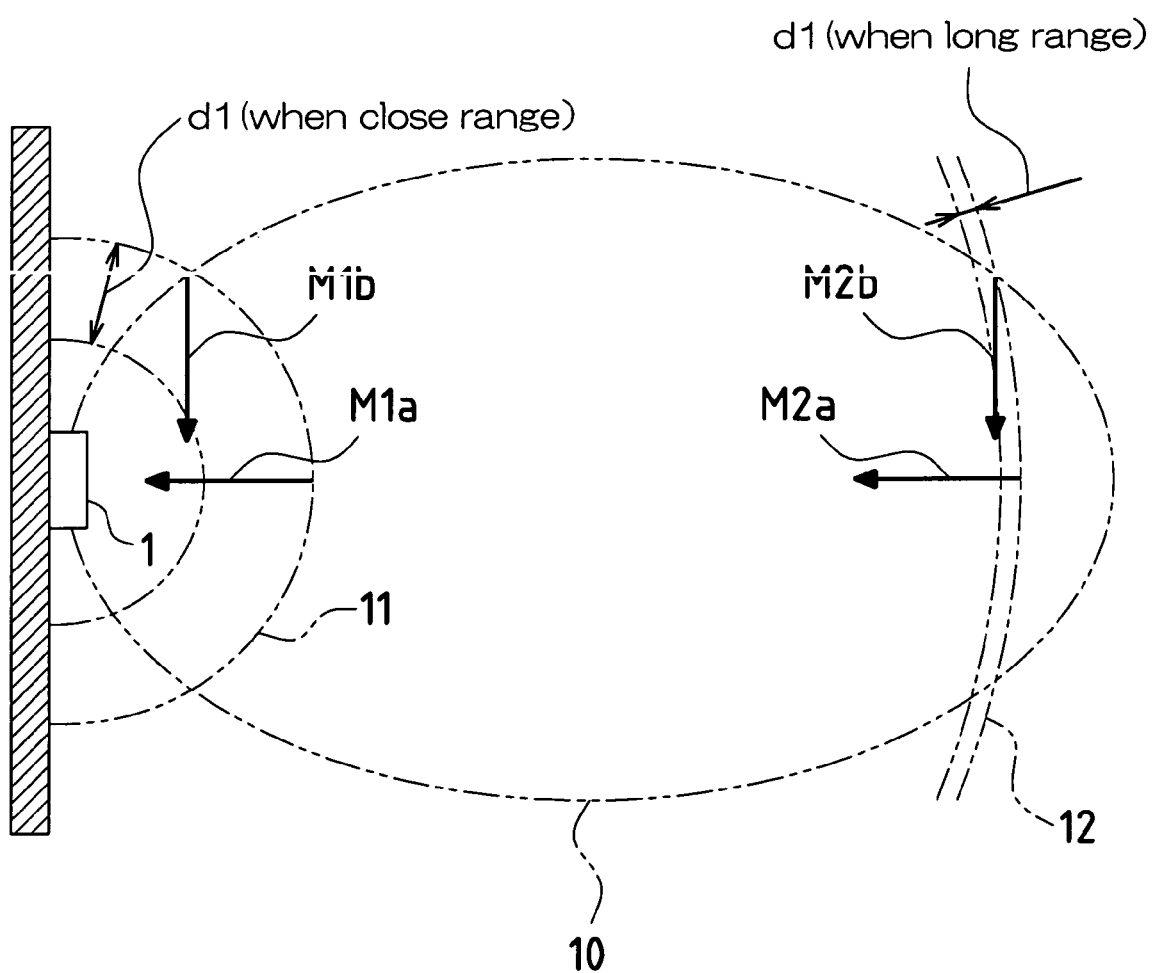
FIG. 2 is an explanatory diagram of a relationship between an example of a plants countermeasure level setting in the microwave sensor associated with the present invention and the movement of an intruder.

FIG. 2 is an explanatory diagram of a relationship between an example of the plants countermeasure level d1 setting in the microwave sensor 1 associated with the present invention and the movement of an intruder. Here, the plants countermeasure level d1 in the close range is set to "movement distance in 1 second period: 50 cm," which is the same as the plants countermeasure level d100 in the conventional microwave sensor 100 shown in FIG. 5, and the plants countermeasure level d1 in the long range is set to "movement distance in 1 second period: 15 cm", for example, but there is no limitation to these settings.

(1) When an Intruder Approaches from Substantially the Front

We will first consider a case in which an intruder approaches from substantially the front of the microwave sensor 1.

When an intruder approaches from a substantially front-on position from a line 11 of a predetermined distance comparatively close to the microwave sensor 1 as shown by M1a, the microwave sensor 1 obtains a value substantially equivalent to the length of M1a as the amount of change in the distance to the target.

Similarly, when an intruder approaches from a substantially front-on position from a line 12 of a predetermined distance comparatively distant from the microwave sensor 1 as shown by M2a (same length as M1a), the microwave sensor 1 obtains a value substantially equivalent to the length of M2a as the amount of change in the distance to the target.

In either case, since the amount of change in the distance to the target exceeds the plants countermeasure level d1, the microwave sensor 1 is able to detect the intruder.

(2) When an Intruder Moves Crosswise Over the Supervision Area 10

Next, a case is considered in which an intruder appears at a side of the supervision area 10 of the microwave sensor 1 (corresponding to the upper or lower part in FIG. 2) and moves crosswise over the supervision area 10 with almost no approaching movement toward the microwave sensor 1.

It should be noted that it is assumed to detect an intruder without fail at the first point in time of intrusion into the supervision area 10.

Figure 5:
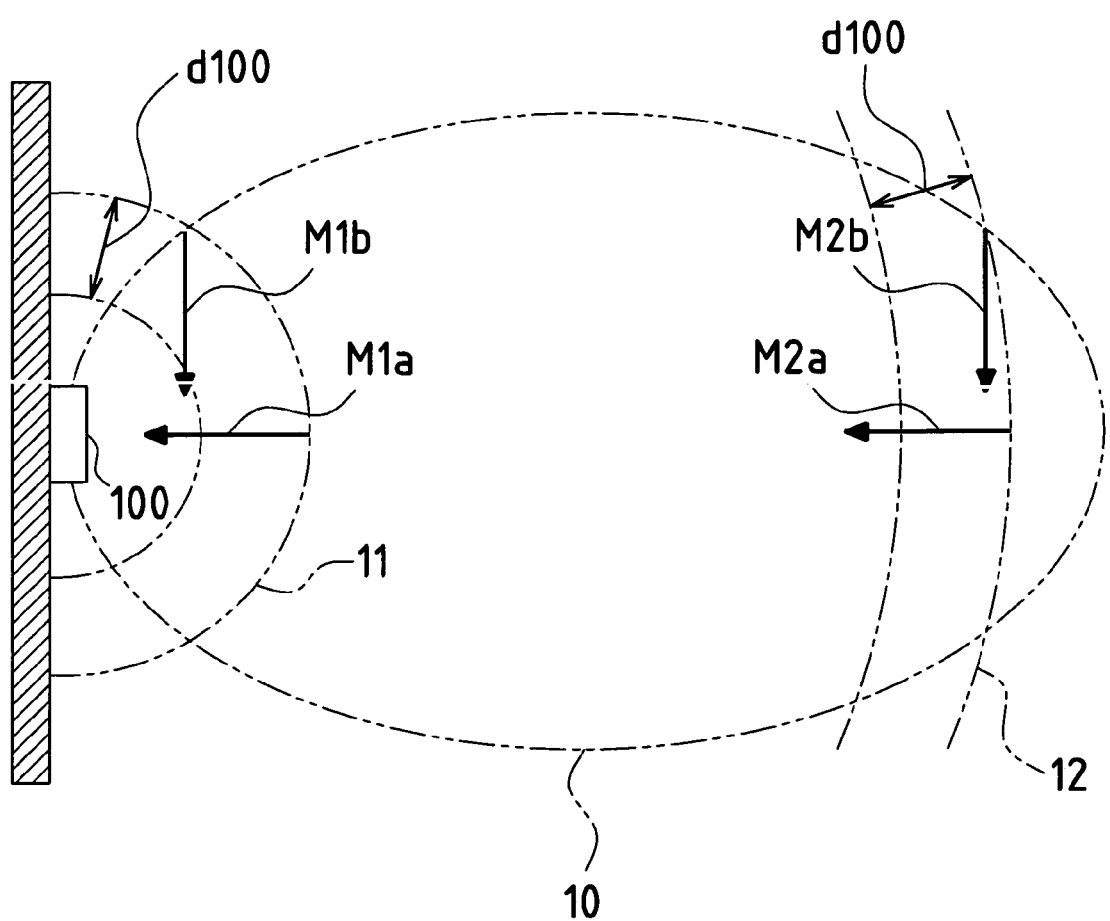
FIG. 5 is an explanatory diagram of a relationship between a plants countermeasure level in a conventional microwave sensor and the movement of an intruder.

When an intruder approaches from a position at one side (upper side in FIG. 2) on the line 11 of a predetermined distance comparatively close to the microwave sensor 1 as shown by M1*b*, the plants countermeasure level d1 in the close range is the same as the plants countermeasure level d100 of the conventional microwave sensor 100 shown in FIG. 5, and therefore, it is possible to detect the intruder in the same manner as the conventional microwave sensor 100.

On the other hand, when an intruder approaches from a position at one side (upper side in FIG. 2) on the line 12 of a predetermined distance comparatively distant from the microwave sensor 1 as shown by M2*b*, the angle formed by the direction toward the microwave sensor 1 and the direction of M2*b* becomes large so as to be close to a right angle. The value obtained as the amount of change in the distance from the microwave sensor 1 to the target is considerably small since it is a value that corresponds to a component of M2*b* in the direction toward the microwave sensor 1, but since the plants countermeasure level d1 is also set small in the long range, the amount of change in the distance to the target exceeds the plants countermeasure level d1 and the microwave sensor 1 becomes able to detect the intruder.

An example was shown in the above description in which the setting of the plants countermeasure level was switched between close range and long range, but there is no limitation to this. For example, this may be divided into three or more distance divisions with the setting becoming progressively smaller from divisions on the close range side to divisions on the long range side. Alternatively, in addition to setting the long range side to values smaller than the values of the close range side, areas of intermediate distances may be set using interpolation calculations, but there is not limitation to these setting methods.

With the configuration of the above-described embodiment, the amount of change per unit of time in the relative distances that are detected does not exceed the plants countermeasure level at distances comparatively close to the microwave sensor 1 even if there is shaking of plants or the like due to wind, and therefore, occurrences of false alerts are avoided as much as possible. In a case where an intruder has appeared, the amount of change per unit of time in the relative distances that are detected exceeds the plants countermeasure level as is ordinary, and therefore, a failure to give an alert is highly unlikely. On the other hand, at distances comparatively distant from the microwave sensor 1, the reflected waves from comparatively small objects such as plants shaking due to the wind are weak, and therefore, even when the plants countermeasure level is set to a small value, there little possibility of a false alert. Also, since the reflected waves from comparatively large objects such as an intruder (human figure) are strong, the relative distance to that object is detected reliably and, moreover, since the plants countermeasure level is set to a small value, precise detection is possible even when the intruder moves crosswise over the supervision area.

Other Embodiments

Application of the present invention is not limited to a microwave sensor in which a target detection object is determined using microwaves of two different frequencies, and may be applied to a microwave sensor in which a target detection object is determined using microwaves of three or more different frequencies. Furthermore, it is also possible to apply the present invention to a type of sensor by which the relative distance to a detection object is detected, such as an ultrasonic wave sensor or the like.

The present invention can be embodied and practiced in other different forms without departing from the spirit and essential characteristics thereof. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

What is claimed is:

1. A microwave sensor for transmitting a plurality of microwaves of different frequencies toward a detection area and carrying out an object detection operation based on reflected waves of the microwaves from an object present in the detection area, the microwave sensor comprising:
    a distance identification means for obtaining a relative distance to the object present in the detection area based on the reflected waves;
    a movement-distance identification means for obtaining a movement distance per unit of time of the object present in the detection area; and
    an object determination means for receiving output from the distance identification means and the movement-distance identification means, and carrying out an operation for object detection by setting a movement distance value per unit of time threshold which is a threshold for determining object detection, to a first value corresponding to a movement distance that is very unlikely to occur by plants moving due to wind when the relative distance to the object present in the detection area is less than a predetermined value and by setting the movement distance value per unit of time threshold to a second value smaller than the first value when the relative distance is the predetermined value or greater.

2. The microwave sensor according to claim 1, wherein the distance identification means is operable to measure the relative distance to the object based on a phase difference of reflected waves of the microwaves from the object present in the detection area.

3. The microwave sensor according to claim 1, wherein the movement-distance identification means is operable to receive output from the distance identification means and measure the amount of change per unit of time in the relative distance to the object.

4. The microwave sensor according to claim 1, wherein the first value is 50 cm and the second value is 15 cm.

5. A microwave sensor for transmitting a plurality of microwaves of different frequencies toward a detection area and carrying out an object detection operation based on reflected waves of the microwaves from an object present in the detection area, the microwave sensor comprising:
    a distance identification means for obtaining a relative distance to the object present in the detection area based on the reflected waves;
    a movement-distance identification means for obtaining a movement distance per unit of time of the object present in the detection area; and
    an object determination means for receiving output from the distance identification means and the movement-distance identification means, and carrying out an operation for object detection by setting a movement distance value per unit of time threshold, which is a threshold for determining object detection, to a first value corresponding to a movement distance that is very unlikely to occur by plants moving due to wind when the relative distance to the object present in the detection area is less than a predetermined value and by setting the movement distance value per unit of time threshold to become progressively smaller than the first value as the relative distance increases from the predetermined value.

6. The microwave sensor according to claim 5, wherein the distance identification means is operable to measure the relative distance to the object based on a phase difference of reflected waves of the microwaves from the object present in the detection area.

7. The microwave sensor according to claim 5, wherein the movement-distance identification means is operable to receive output from the distance identification means and measure the amount of change per unit of time in the relative distance to the object.

8. The microwave sensor according to claim 5, wherein the first value is 50 cm.

* * * * *